2,766,162

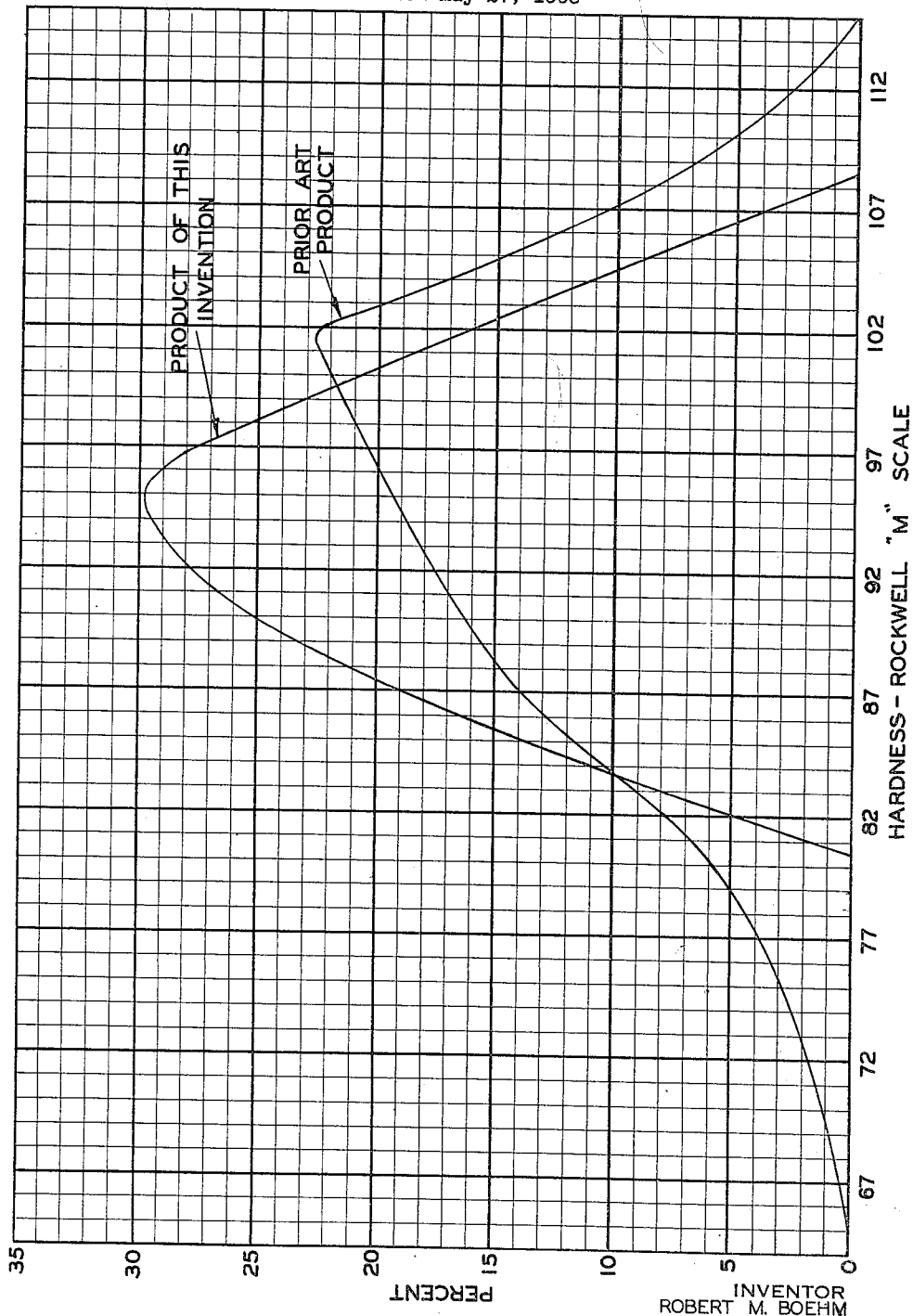

METHOD OF PREPARING LIGNOCELLULOSE HARDBOARD

Robert M. Boehm and George G. Simpson, Laurel, Miss., assignors to Masonite Corporation, Laurel, Miss., a corporation of Delaware Application May 27, 1953, Serial No. 357,662

3 Claims. (Cl. 154—100)

This invention relates to a method of preparing improved lignocellulose hardboard products. More particularly, the invention relates to a novel process for the preparation of lignocellulose hardboard products characterized by substantially uniform density and by greatly improved surface characteristics. Even more particularly, the invention relates to the preparation of decorative lignocellulose hardboard products distinguished by their substantial freedom from surface irregularities.

In the manufacture of hardboard articles, the wood or other lignocellulose raw material is ordinarily subjected to disintegration treatment by mechanical means or by thermal hydrolysis followed by explosive rupture. Subsequently the disintegrated material is refined to obtain the desired fiber length and degree of separation followed by formation of the fibers into laps on modified Fourdrinier or cylinder type forming machines, or by pressing in a confined condition. One type of hardboard product prepared therefrom and characterized by its having two smooth surfaces is of outstanding commercial desirability. A method of preparing such a hardboard product is described and claimed in United States Patent No. 2,120,137 to Mason. According to the disclosure of this patent, the above described fiber lap is first dried to form a relatively light and porous sheet which is substantially self-supporting. The dried lap is thereafter consolidated under heat and pressure to obtain a product which usually has a density within the rage of about 1.0 to about 1.3. In general, the pressures, temperatures, and time involved are variable and may range from about 1000 p. s. i. to about 2000 p. s. i. pressure at temperatures of about 450° F. to about 350° F. for about 3 minutes to about 7 or 8 minutes. Other variations may be employed but, ordinarily, the pressures involved will not exceed about 2000 p. s. i. nor will the temperatures exceed 450° F. The dried laps are pressed between smooth platens or surface plates and, therefore, both sides of the finished board are substantially smooth and polished. The products are useful in the preparation of tile board and the like articles, and are also commercially desirable in the preparation of laminates and particularly of decorative laminates.

The above described type of hardboard products has been of outstanding importance for many uses. However, it has become increasingly necessary, in order to maintain economical production, to greatly increase the machine speeds in the preparation of the felted fibrous wet laps. Accordingly, the formation of the laps, i. e. the distribution therethrough of the fibers and bundles of fibers, has become less uniform as the machine speeds have been increased. Although the products now manufactured have utility in many fields, their usefulness in the preparation of many articles has been diminished. This is due mainly to the presence in the finished products of surface irregularities. While the hardboard articles appear to have substantially smooth surfaces and uniform densities, they actually consist of many small areas of relatively high density and, similarly, areas of relatively low density. In fabricating these boards, the lack of uniform density therethrough results in serious surface irregularities in the finished products. For example, where the hardboard is to be surfaced with one or more coats of baked enamel, the surface of the finished enameled product will exhibit considerable waviness and cockles due to variations in density in the board. In the preparation of decorative laminates the surface defects are of an even more serious nature; upon applying decorative surface sheets to the hardboards, usually under heat and pressure, the areas of high density cause distortion of the decorative pattern and the products have reduced commercial desirability.

It is a primary object of the present invention to provide a novel method for the production of lignocellulose hardboards possessing substantially uniform density through their entire area.

It is another object of the invention to provide a method for the preparation of improved decorative hardboards characterized by freedom from surface irregularities.

A further object of the invention resides in the provision of a novel method of eliminating high density areas in lignocellulose hardboard products. Other advantages of the invention will become apparent from the following detailed description thereof.

In carrying out the method of the invention, wet laps are first preferably formed by felting lignocellulose fibers into continuous sheet form followed by cutting of the sheet to the desired lap length. Where desired, of course, the wet laps may be formed by a semi-continuous process or even by a batch procedure. The so-produced wet laps are then dried by passage through a drier of conventional design. In this treatment, substantially all of the moisture is removed from the laps which emerge from the drier as relatively light and porous self-supporting sheets. Thereafter, the dry sheets are prepared for consolidation by arranging pairs of them in surface to surface relationship together with a dividing or separating material therebetween. The separating medium may comprise any material which will prevent the sheet surfaces from sticking or welding together during consolidation thereof. Materials suitable for this purpose include such compositions, in the form of discrete particles, as clay, talc, mica, stone dust, cotton flock, graphite, charcoal, ground tung or other nut shells, and the like compositions. It is also possible to employ thin membranous materials such as metal foil, paper, fabric, wire cloth, and the like membranes. The primary factor involved in the selection of a separating agent is the provision of a layer through which the more dense areas of the lignocellulose sheets may extend into the facing surface of the oppositely arranged sheet during consolidation thereof. In arranging the dried laps in pairs, it is of no consequence whether the top or bottom surfaces of the individual laps are placed together. However, in some applications it may be more desirable to place the bottom surfaces of the dried laps together so as to eliminate from the consolidated product the texture appearance imparted thereto by the forming screen.

The so-arranged pairs of lignocellulose sheets are then placed in the openings of a conventional hydraulic press equipped with heated platens. Usually, such presses have several openings, i. e. from about 12 to about 20 or more, so that several sheets may be consolidated in one pressing operation. Following the press charging procedure, the sheets are subjected to heat and pressure, within the limits hereinbefore prescribed, until the sheets have been converted to hardboards having apparent densities within the preferred range of from about 1.0 to about 1.3. The densities of these intermediate articles are termed "apparent" for the reason that the back surface of each board is irregular in appearance, i. e. the surfaces which were in contact during consolidation are comprised of many protuberances and depressions. Inasmuch as density is determined partially by the caliper of the board it will be appreciated that a true evaluation thereof is difficult or even impracticable due to the contour of the irregular surface of the board. Apparent density values, therefore, represent only average specific gravity with no concern for thickness variations over the entire board area.

However, it has been discovered that the protruding areas of the board back surface comprise areas of a density which is substantially the same as the density of the surrounding non-protruding or even depressed areas. This discovery is an outstanding feature of the present invention inasmuch as the following steps of the process stem directly therefrom as do the benefits derived from the process. Briefly, the boards are then passed through a sanding or planing device wherein the protuberances of the one board surface are removed. The actual density of the board is then accurately measurable and has been found to lie within the range of from about 1.1 to about 1.35 or slightly higher. At the same time that the heretofore bumpy surface has been reduced to substantial smoothness, it should also be noted that the opposite surface of the board, i. e. the front surface, contains relatively few high density areas and these are of considerably lower density than where the boards have been consolidated individually between two smooth plates as in prior art methods. The boards are, therefore, of substantially uniform density throughout and may desirably be employed per se or may be further densified during lamination thereof in the production of decorative and the like laminates.

The uniform density hardboards thus produced may advantageously be employed in many fields. For example, either the smooth and polished front surface or the abraded back surface may be finished by the application thereto of a film of paint, lacquer, enamel, or the like coating material. Similarly, there may be applied to one or both surfaces any selected resinous sheet which provides a decorative or protective coating to the board. Moreover, the improved hardboards may be impregnated with drying oils, resinous compositions, and the like materials and thereafter heat treated, as by baking or equivalent treatment, to produce boards distinguished by increased strength, hardness, resistance to water, etc. Any and all of these finishing treatments produce finished products of greatly improved appearance and increased dimensional stability. The improvements are primarily due to the substantially uniform density of the boards. For instance, in impregnating the boards with drying oil compositions the oil is absorbed uniformly and, therefore, during the baking thereof polymerization of the oil is substantially invariable throughout the sheet and thus the properties of the boards are consistent over their entire area. Similarly, since the hardboards contain few areas of greater or lesser density than the average value, any selected surface coating presents an appearance which is greatly improved over prior art products. Here again the improvement is due principally to the even absorption of coating agent and the resulting freedom from surface irregularities in the finished article.

As stated above, abrasion of the irregular back surface of the above described boards to substantial smoothness produces a hardboard of substantially uniform density. While this characteristic is of considerable commercial importance in the finishing treatments hereinbefore described and thus provides an appreciable advance over prior art results, an equally outstanding improvement stems therefrom in the manufacture of laminates, and particularly decorative laminates, from the improved hardboards.

Usually, in preparing decorative laminates, the components are assembled, prior to consolidation, into a so-called lay-up substantially in the following order:

1. Surface sheet of paper impregnated with clear resin.
2. Decorative sheet.
3. Adhesive sheet.
4. Hardboard.
5. Adhesive sheet.
6. Backing sheet.

This assembly may be varied by the elimination of the decorative sheet or by the inclusion of additional sheets of hardboard together with the requisite additional adhesive sheet or sheets. In any event, ordinarily two of these stacks are pressed at once in one press opening. In such cases the stacks are so arranged that the surface sheets are in contact with the smooth press plates and the stacks may be separated by conventional means. The stacks are then converted into laminates under heat and pressure. Normally, the temperature employed will not exceed about 350° F. and the pressure will be within the range of about 0–1500 p. s. i. depending on the desired density of the product and the characteristics of the resinous sheets used. Subsequent to the hot pressing cycle, the press platens may be cooled and the laminates thereby cooled before removal from the press. During the pressing treatment, the hardboard core may be further consolidated to a final density of about 1.3 to about 1.4 or, where little or no pressure is employed, there will of course be little or no increase in the density of the laminate. In the prior art processes it was during this lamination step that the high density areas of the hardboard core caused distortion of the decorative design. In the present novel method, because of the uniform density of the hardboard core, there is little or no distortion of the decorative design and the product is characterized by its freedom from surface irregularities. Thus it will be appreciated that the invention provides a method of overcoming a serious problem attendant upon the use of lignocellulose hardboards in the production of decorative sheet articles. Similarly, where it is desired to finish the repressed board with a baked enamel surface or by other coating treatment, the final product is distinguished by a surface having a higher degree of smoothness than was heretofore obtainable in the art.

In the preparation of decorative articles, the surface sheets and the decorative, adhesive, and backing sheets are not of critical nature in the invention and are consequently those ordinarily employed in similar commercial operations. They may contain any of the ordinarily employed resins such as phenolic, melamine, urea, and the like resins and, in the case of low pressure or no pressure laminates, may include any commercial hot or cold setting glues of both synthetic and animal derivation.

The invention will be more particularly described by the following specific examples. It should be understood, however, that the examples are given for illustrative purposes alone and the invention is to be limited only by the scope of the appended claims.

EXAMPLE 1

Fibrous sheets having densities of about 0.4–0.5 and moisture contents of from 2% to about 6%, which had been prepared from thermally hydrolyzed lignocellulose, were arranged in pairs in surface to surface relationship with a thin layer of talc separating the sheets. A pair of the so arranged sheets was charged into each opening of a multiple platen press, the platens of which were heated by steam at 400 p. s. i. to a temperature of 448° F. The press was then closed and the sheets were heated until the temperature at their centers was within the range of 360°–375° F. During the heating period the pressure applied to the sheets was only that necessary to hold the press in closed position, i. e. about 75 p. s. i. During the heating period, this pressure was released at 30 second intervals to allow the escape of volatilized material. After a heating period of about 5 minutes, hydraulic pressure of about 1500 p. s. i was applied to the sheets and this pressure was maintained for 1 minute, at which time the center temperature of the sheets had reached 430° F. The platen pressure was then released and the boards were discharged from the press openings. The consolidated board products had apparent specific gravities ranging from about 1.17 to about 1.21. The surfaces of the boards which had been pressed together were irregular in appearance. This back surface of each board was thereafter sanded to remove all of the bumps and to produce a board of uniform caliper. The actual specific gravity of the abraded boards ranged from about 1.2 to about 1.25.

Half inch square samples were taken from the boards produced as described above. Hardness values, which are representative of the density of the product, were obtained on the samples with a Rockwell hardness testing machine. In terms of Rockwell "M" scale readings on hundreds of such half inch square samples, approximately 93% thereof had hardness values lying within the range of from 85 to 105. This is representative of board products having unusually uniform density throughout their entire area. Comparative values were obtained on ordinary hardboard products prepared substantially as described above but differing therefrom in that only one sheet was pressed in each press opening and wherein the hardboard product had two smooth surfaces upon removal from the press. Only 75% of these samples had hardness values within the range of 85–105 while the remaining 25% were within the ranges of from 105 to 115 and from 85 to 65. These values indicate that the prior art hardboard products were characterized by non-uniform densities and consisted of areas of extremely high density and other areas of very low density. A graphic illustration of the comparative uniformity of densities of prior art boards and those of the present invention is given in the accompanying drawing. The values set forth in the graph were gathered from representative samples of both types of product and comprise several hundred hardness evaluations. The table below sets forth the percentage of samples of each product falling in the individual hardness ranges.

*Table 1*

| Hardness Range Rockwell "M" Scale | Product of this Invention, Percent Samples | Prior Art Product, Percent Samples |
| --- | --- | --- |
| 65–69 | | 0.5 |
| 70–74 | | 1.0 |
| 75–79 | | 3.5 |
| 80–84 | 5.0 | 7.5 |
| 85–89 | 19.0 | 14.0 |
| 90–94 | 28.0 | 17.0 |
| 95–99 | 28.0 | 20.5 |
| 100–104 | 16.0 | 22.5 |
| 105–109 | 4.0 | 10.5 |
| 110–114 | | 3.0 |

In another trial, samples of both types of products were coated with white enamel and then baked to present an unusually glossy surface coating. In every instance, the samples prepared according to the method of the present invention presented coated surfaces much smoother in appearance than those prepared from the prior art hardboard products.

EXAMPLE 2

Boards prepared according to the present invention and having specific gravities ranging from about 1.2 to about 1.25 were arranged into lay-ups as hereinbefore described with a surface sheet of paper impregnated with melamine-formaldehyde resin, a resin impregnated decorative sheet thereunder, an adhesive sheet, a hardboard sheet, an adhesive sheet thereunder and finally a backing sheet. Two of these lay-ups arranged with the backing sheets positioned against each other were charged into a press. The stacks were subjected to 1350 p. s. i. pressure and heated until the centers of the stacks reached a temperature of 275°–285° F. The pressure and temperature was thereafter maintained at this level for 20 minutes and then the platens were chilled under pressure until the temperature at the centers of the stacks had been lowered to 105° F. The laminated products thus produced were characterized by extremely smooth surfaces and almost complete freedom from warping. These products had specific gravities of about 1.35 and slightly higher. On the other hand, laminates produced in a similar manner from prior art hardboard products were uniformly less desirable for commercial use due to severe surface irregularities.

We claim:

1. A method of preparing improved lignocellulose hardboard which comprises arranging in surface to surface relationship two relatively light and porous sheets of felted lignocellulose fibers, said sheets being separated from each other by a relatively thin layer of separating material, consolidating and densifying said sheets to an apparent density of about 1.0–1.3 under heat and pressure between smooth pressing plates, said consolidation step being carried out at a pressure within the range of from about 500 p. s. i. to about 2,000 p. s. i. and at a temperature within the range of from about 450° F. to about 350° F., releasing the pressure and separating the densified sheets which are characterized by smooth front surfaces and by back surfaces containing appreciable irregularities, abrading the back surfaces of the densified sheets to remove the irregularities therefrom, and then repressing said sheets between smooth pressing plates under heat and pressure sufficient to further densify the sheets to a specific gravity of about 1.3–1.4 whereby there is produced lignocellulose hardboard characterized by substantially uniform density throughout its entire area.

2. A method of preparing improved decorative hardboard characterized by its freedom from surface irregularities which comprises: first, pressing between smooth pressing plates pairs of relatively light and porous felted sheets of lignocellulose fibers separated from each other by a thin layer of separating material, said pressing treatment effected at a pressure within the range of from about 500 p. s. i. to about 2,000 p. s. i. and at a temperature within the range of from about 450° F. to about 350° F., releasing the pressure and separating the densified sheets which are characterized by smooth front surfaces and irregular back surfaces; secondly, abrading the back surfaces of the densified sheets to remove the irregularities therefrom; and thirdly, applying to one of the surfaces of each of the densified lignocellulose sheets decorative and resin impregnated surface sheets under heat and pressure sufficient to bond together the separate layers and to further densify said lignocellulose sheets whereby there is produced decorative hardboard distinguished by its freedom from surface irregularities.

3. A method of preparing decorative laminated sheet product characterized by its freedom from surface irregularities which comprises first pressing between smooth pressing plates pairs of relatively light and porous felted sheets of lignocellulose fibers separated from each other by a thin layer of separating material, said pressing operation being effected at a pressure within the range of about 500 p. s. i. to about 2,000 p. s. i. and at a temperature within the range of about 450° F. to about 350° F., whereby said sheets are consolidated to an apparent density of about 1.0 to about 1.3, then releasing the pressure and separating the densified sheets which are characterized by smooth front surfaces and irregular back surfaces, secondly, abrading the back surfaces of the densified sheets to remove the irregularities therefrom, and thirdly, applying to one of the surfaces of each of the densified lignocellulose sheets decorative and resin impregnated surface sheets under heat and pressure sufficient to bond together the separate layers and to further densify said lignocellulose sheets.

References Cited in the file of this patent

UNITED STATES PATENTS

| | | |
|---|---|---|
| 1,067,825 | Manson | July 22, 1913 |
| 1,454,845 | Clay | May 15, 1923 |
| 1,990,554 | Libberton | Feb. 12, 1935 |
| 1,997,996 | Carstens | Apr. 16, 1935 |
| 2,080,078 | Mason et al. | May 11, 1937 |
| 2,431,720 | Willey | Dec. 2, 1947 |
| 2,631,960 | Dafter | Mar. 17, 1953 |
| 2,635,509 | Cowie et al. | Apr. 21, 1953 |
| 2,693,619 | Goss | Nov. 9, 1954 |

FOREIGN PATENTS

| | | |
|---|---|---|
| 472,441 | Canada | Mar. 27, 1951 |